United States Patent [19]
Endo et al.

[11] 3,795,798
[45] Mar. 5, 1974

[54] HYBRID COMPUTING SYSTEM OF AUTOMATIC CONNECTION TYPE

[75] Inventors: Takeyuki Endo, Hachioji; Norio Yokozawa, Fuchu; Shigeru Watanabe, Kodaira; Kunihiro Okada, Tanashi, all of Japan

[73] Assignee: Hitachi, Ltd., Tokyo, Japan

[22] Filed: Sept. 1, 1972

[21] Appl. No.: 285,648

[30] Foreign Application Priority Data
Oct. 22, 1971   Japan............................ 46-83318

[52] U.S. Cl. .................... 235/150.5, 340/147 R
[51] Int. Cl. ............................................. G06j 1/00
[58] Field of Search... 235/150.5; 340/172.5, 147 C, 340/147 CV, 147 CN, 147 G, 147 LP, 147 R, 166; 444/1

[56] References Cited
UNITED STATES PATENTS

| | | |
|---|---|---|
| 3,453,421 | 7/1969 | Tonnesson ................. 340/166 R X |
| 3,243,582 | 3/1966 | Holst ............................. 340/172.5 |
| 3,480,769 | 11/1969 | Gilbert ....................... 235/150.5 X |
| 3,493,731 | 2/1970 | Lemonde ..................... 235/150.5 |
| 3,541,513 | 11/1970 | Paterson ....................... 340/172.5 |

Primary Examiner—Joseph F. Ruggiero
Attorney, Agent, or Firm—Craig and Antonelli

[57] ABSTRACT

In a hybrid computing system in which a plurality of analog operating elements are selectively automatically connected to each other through a switch matrix for constituting a desired analog operating circuit, the analog operating elements are divided into a plurality of groups each called a module and the desired analog operating elements are selected from these modules to constitute the desired analog operating circuit. In the system, the modules are numbered in the order of sequence and the analog operating elements are successively selected in one direction starting from the module having the smallest or largest ordinal number.

4 Claims, 9 Drawing Figures

STAGE a      STAGE b

*A, *B, *C,
TOP ADDRESS OF LIST
(EACH LIST SHOWS ONE ELEMENT.)

HYBRID COMPUTING SYSTEM OF AUTOMATIC CONNECTION TYPE

BACKGROUND OF THE INVENTION

1. Field of the Invention

This invention relates to an automatic connection system for a hybrid computer of the automatic connection type.

2. Description of the Prior Art

Heretofore, operating circuits of an analog hybrid computer have been provided by manually inserting patch cords into holes on patch boards corresponding to input and output terminals of analog operating elements. Therefore, the connection has a freedom which is considered to be nearly infinite. In the case of an automatic connection, however, input and output terminals of analog operating elements are fixedly connected to a switch matrix constituted by arranging many switches in the form of a matrix, and in many cases, the switches are turned on and off by a digital computer for attaining the automatic connection between the operating elements. In the case of the automatic connection, a one-stage switch matrix as shown in FIG. 1 is preferably used to provide an extremely high freedom of connection. In FIG. 1, the number of inputs to the elements is M which is fixed and the number of outputs from the elements is N which is also fixed. Suppose that the ratio of the number of inputs M to the number of outputs N is E, then the number of necessary switches S is given by $S = EN^2$ and is proportional to the square of the number of outputs from the elements. Thus, with such a one-stage switch matrix, the number of switches is extremely large, and a multistage switch matrix is generally employed.

FIG. 2 shows a two-stage switch matrix, and in this case, the number of switches is proportional to $N^{3/2}$. However, due to the fact that the stages are fixedly connected by the lines, desired connection cannot be attained if the lines are already in use. Therefore, the freedom of connection is generally remarkably low compared with the manual system. The lines to be used for connection are automatically determined upon determination of the input and output terminals of the elements, and the switches used for connection are also determined automatically. It is the key point of the automatic connection system how to obviate such an inconvenience. In other words, it is important how the operating circuit is actually constituted by suitably selecting the operating elements while avoiding an undesirable situation of impossibility of actual connection. Heretofore, freedom of connection has been discussed only from the viewpoint of the structure of the switch matrix and an insufficient countermeasure has been taken to deal with the situation of impossiblity of connection. Prior practice has been such that the function of cancelling all the existing connection and re-establishing new connection is added to the software to deal with the situation of impossibility of connection so that man can intervene for breaking through such a situation.

In the prior practice, the user of an analog hybrid computer is entrusted with the selection of necessary elements and connection is attained by following the instructions applied from a console typewriter according to the software. While this method is advantageous in that it makes the best use of the manmachine communication in the analog hybrid computer, it has various defects. In the first place, a long period of time is required for connection due to the invervention of man. Secondly, the efficiency of utilization of the switch matrix is low and an effort to compensate for the reduced efficiency by the increase in the number of switches results in the increase in the cost of the switch matrix. Thirdly, even if all the connection is cancelled to avoid the undesirable situation of impossibility of connection, the probability with which the connection is necessarily successfully attained in the next chance after the cancellation of connection is very low and a long period of time is inevitably required until the connection is changed.

SUMMARY OF THE INVENTION

With a view to obviate the defects above described, it is a primary object of the present invention to provide a novel and improved system which ensures efficient use of connection matrixes and reduces the period of time required for connection thereby readily eliminating the undesirable situation of impossibility of connection.

In order to attain the above object, the present invention provides a system in which all the operating elements for constituting an operating circuit are listed in lists according to their logical names so that, in the event of occurrence of impossibility of connection, anyone or both of the two elements which cannot be connected to each other can be interchanged with the element or elements of the same kind, or if it is unable to establish necessary connection between the input of one of the two elements and the output of the other element or between the input and output of another element, a further element which does not adversely affect the normal operation of the operating circuit can be interposed between the input and the output. The present invention having the above feature can eliminate substantially all the prior defects and is effective for the reduction of the cost of the hybrid computer.

DESCRIPTION OF THE PREFERRED EMBODIMENTS

Figure 1:
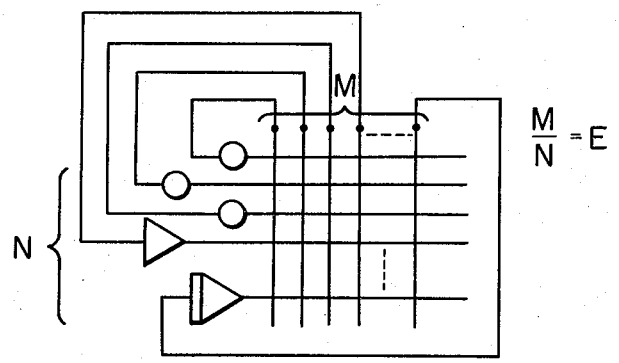
FIG. 1 shows a method of connection between elements of an operating circuit using a one-stage switch matrix.
Figure 2:
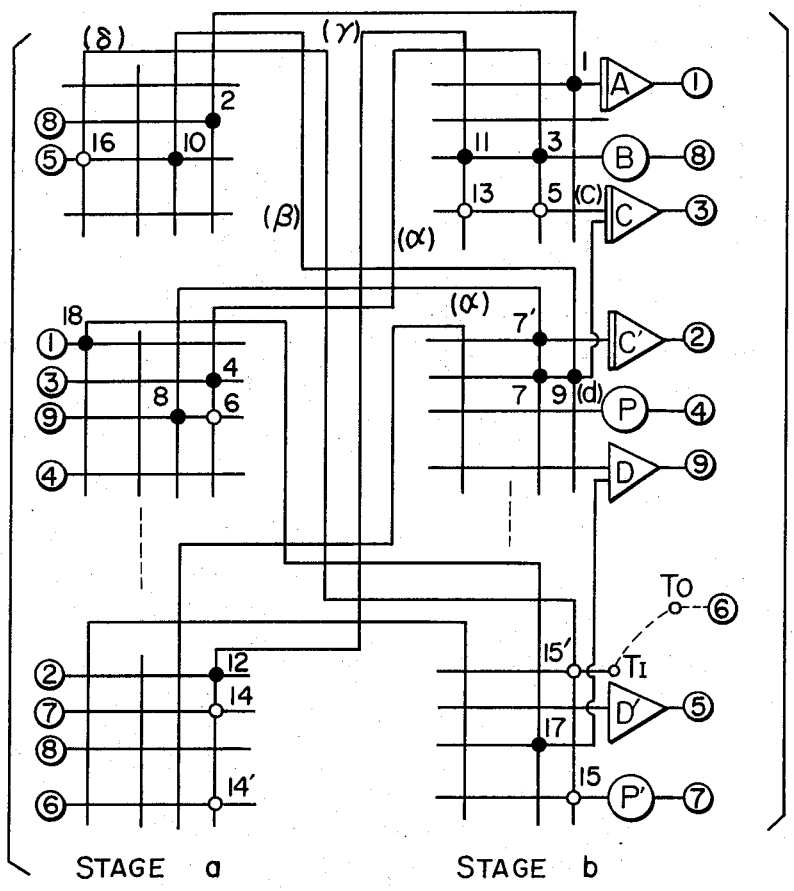
FIG. 2 shows a method of automatic connection and of changing connection between elements of an operating circuit using a two-stage switch matrix.
Figure 5:
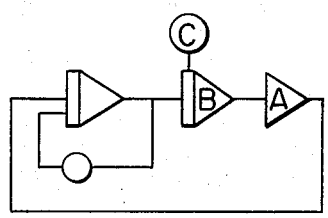
FIG. 5 is a circuit diagram of an operating circuit for illustrating the operation of an arrangement shown in FIG. 6.
Figure 6:
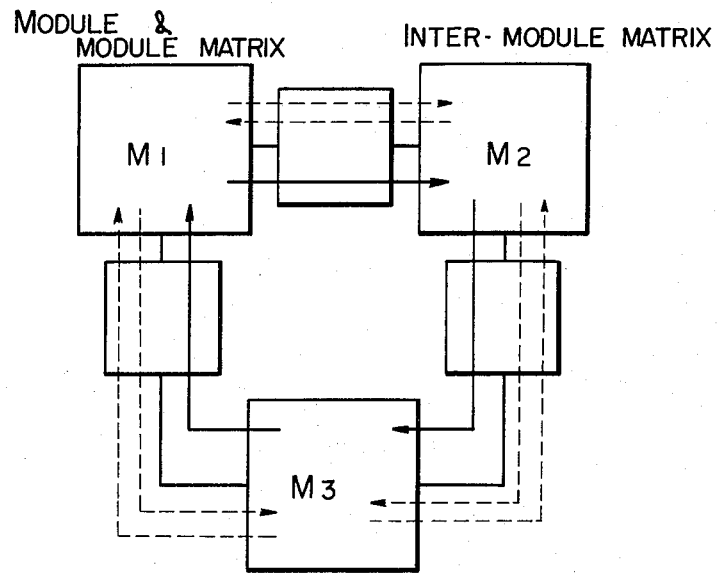
FIG. 6 shows in which manner the actual operating elements required in the operating circuit shown in FIG. 5 are selected from a plurality of modules.

A two-stage switch matrix as shown in FIG. 2 is used to connect the input and output terminals of a plurality of operating elements for constituting an operating circuit as shown in FIG. 5. In this case, all the analog operating elements in a computer are divided into a plurality of groups each including a two-stage switch matrix as shown in FIG. 2. Each group is called a module and all the modules have the same construction. Therefore, all the operating elements are arranged in the form of an assembly as shown in FIG. 6. Since each module is a unit of all the operating circuits, these modules must be connected to each other and another matrix is required for establishing the connection between any two modules. Therefore, the entire arrangement includes a plurality of module matrixes for connecting the elements constituting the individual modules and a plurality of matrixes, hereinafter to be referred to as inter-module matrixes, for connecting the elements belonging to the individual modules.

Figure 3:
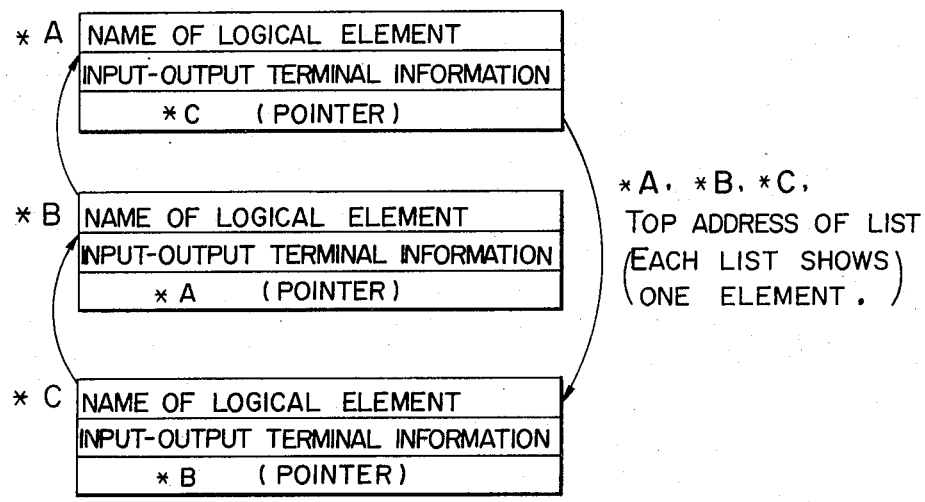
FIG. 3 shows an operating circuit in the form of lists.
Figure 4:
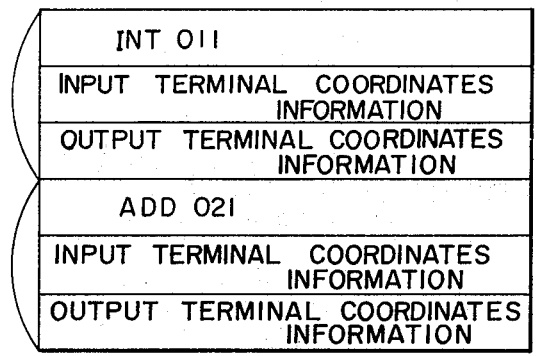
FIG. 4 shows a data table concerning the hardware.

Information put in by man, that is, information representing the state of connection is stored in the form of lists in a core memory. The arrangement of the lists is substantially as shown in FIG. 3. All the lists each representing an operating element are connected to each other by a pointer, and the name of the element is represented by the logical name. FIG. 4 shows a table showing the names of the elements in the actual hardware and the coordinates of the switches in the switch matrix. For example, an integrator is designated by the hardware name INT O11. In the three-digit number O11, the rightmost digit 1 represents the module number and the two digits 01 on the left-hand side represent the fact that the integrator is the first integrator in the module M1. Thus, when an element is selected from one of the modules, the specific module can be readily identified.

Suppose that the element A in the operating circuit shown in FIG. 5 is selected from the module M1 in FIG. 6. In such a case, the element A is directly connected to the element B when the element B belongs also to the module M1. The element B is selected from the module M2 if the element B in the module M1 is already in use and the elements B in the modules M2 and M3 are not in use. Similarly, when the element B is selected from the module M2 and the element C to be connected to the element B is found in both the modules M1 and M2, the element C is selected from the module M2. This concept may be applied to all the operating circuits. In this case, the direction of selection of the operating elements is unidirectional as shown by the solid lines in FIG. 6. Such a directional selection is advantageous in averaging the frequency with which the inter-module matrixes are used.

In another method, the element C may be selected solely from the module M1. According to this method, one of the modules is solely selected so as to use the element C belonging to the specific module as far as possible and the element C is inevitably sought from the other modules when the element C in the specific module is already in use. This method is represented by the dotted lines shown in FIG. 6 in which it will be seen that the connection is attained in two directions. In this method, the frequency with which the individual inter-module matrixes are used is not uniform. In the former method, the number of switches in the inter-module matrixes may be designed on the basis of the mean value of the switches in use, but in the latter method, the number of switches must be designed on the basis of the maximum number required. It is therefore apparent that the former method is useful for the reduction in the number of switches.

Figure 7:
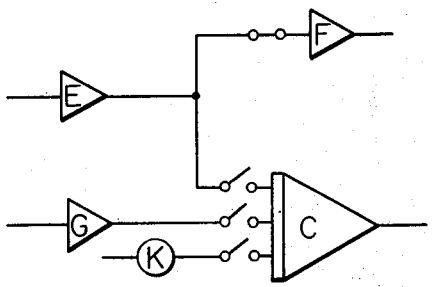
FIG. 7 shows the order of connection between an element having a plurality of input terminals and elements supplying input signals to the element.

Consider now the allocation of operating elements to an operating circuit as shown in FIG. 7. In FIG. 7, the connection between actual elements E and F has been completed already and an element C must now be connected to a plurality of elements E, G and K. In this case, the connection between the elements E and C is carried out preferentially. Identification as to whether or not a specific element is already in use may be easily attained by reference to a table registering only those elements which are already in use. This table registers also faulty elements regarding that these elements are included in the elements which are already in use.

In FIG. 7, any actual elements are not yet allotted to the these elements G and K. This is because, when it is unable to attain the connection between the elements E and C, one of the input terminal of the element C provided for connection between the element C and the element G may be utilized for establishing the connection between the elements E and C. If such a connection cannot be established, the element E may be disconnected from the element F and may be interchanged with another element of the same kind. After the connection between the elements E and C has been established, one of the elements G and K is selected for connection. In this case, the element which is provided in a lesser number is preferentially selected. When the element G, for example, is preferentially selected, the actual element for G is determined to be connected to the element C. If the connection therebetween is impossible, another element corresponding to G is determined once more as will be described later.

The method of allocating the operating elements in the manner above described is advantageous in the effective utilization of the inter-module matrixes and in the reduction of the number of switches in the inter-module matrixes. This method is further advantageous in that the element having been connected already with another element as shown in FIG. 7 can be preferentially selected for connection with a further element thereby avoiding an undesirable situation of impossibility of connection.

Figure 8:
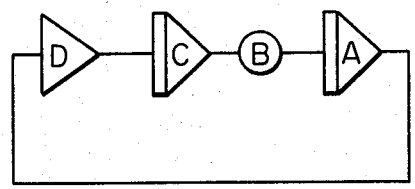
FIG. 8 is a circuit diagram of an operating circuit for illustrating the manner of changing the connection.

When the situation of impossibility of connection occurs inevitably, a method which will be described below may be taken to deal with the situation. Suppose that input and output terminals of elements in an operating circuit as shown in FIG. 8 are connected by means of a two-stage switch matrix as shown in FIG. 2. (This switch matrix is considered herein as a module matrix for the simplicity of description.) As seen in FIG. 2, the matrix comprises two stages, stage $a$ and stage $b$, and each stage comprises a plurality of unit matrixes called blocks. Lines whose number is equal to the number of blocks of the stage $b$ lead out from each block of the stage $a$ for the fixed connection between the stages $a$ and $b$. These lines may connect the stage $a$ with the stage $b$ in any desired manner and there is not any especial restriction on the number of these lines. For the ease of understanding, however, it is assumed herein that these lines are arranged regularly as shown and anyone of the blocks of the stage $b$ is connected with anyone of the blocks of the stage $a$ by one line leading out from each block of the stage $a$. In this case, inputs to the elements are fixedly connected to the stage $b$ and outputs from the elements are fixedly connected to the stage $a$. In FIG. 2, the output terminals of the elements are indicated by the numbers such as ①,②,③,④, . . . . These numbers coincide with the numbers ①,②,③,④, . . . . appearing on the side of the stage $a$. The intersections of the lines in the unit matrixes indicate the switches which are suitably numbered for the ease of understanding. Further, those elements which are required to constitute the operating circuit shown in FIG. 8 are merely shown in FIG. 2.

It is supposed that the switches 1 and 2 are selected for establishing the connection between the elements A and B in FIG. 8, and the switches 3 and 4 are selected for establishing the connection between the elements B and C in FIG. 8. In response to the application of coordinate data for a specific switch to the linkage from a digital computer, a pulse is applied from the linkage to the switch corresponding to the coordinate point represented by the data for turning on the specific switch. The switches are actually turned on after the coordinates of all the switches have been determined.

Suppose that the switches 5 and 6 are subsequently selected for establishing the connection between the elements C and D. However, due to the fact that the line $\alpha$ is already in use for the connection between the elements B and C, the input terminals of the elements B and C and the output terminals of the elements C and D are short-circuited in response to the turn-on of the switches 5 and 6, resulting in impossibility of execution of the operation. One of the methods for avoiding this situation comprises distributing the input terminals of the element C having a plurality of such terminals to the individual blocks of the corresponding number without exclusively connecting the input terminals to the same single block only of the stage $a$ so that, when the above situation occurs, the input terminal $d$ can be selected in lieu of the input terminal $c$ for automatically selecting the line $\alpha'$ in lieu of the line $\alpha$ thereby establishing the desired connection. Another method is employed if the repetition of the above precedure by the number of input terminals cannot still break through the situation. In FIG. 2, the element D' of the same kind as the element D is fixedly connected at its output terminals to the block different from the block to which the element D is connected in the stage $a$. According to the second method, the element D is abandoned and the switches 9 and 10 are selected for establishing the connection between the element D' and the input terminal $d$ of the element C. In this case, the line $\beta$ is selected instead of the line $\alpha$ which is already in use. If the repetition of the above procedure on the elements of the same kind as the element D cannot still attain the desired connection, a further method is employed in which the element C' of the same kind as the element C is selected in lieu of the element C. According to the third method, the input terminals of the element C' must be distributed to the blocks of the stage $b$ in such a manner that these input terminals may not be connected to the same blocks of the stage $b$ to which the input terminals of the element C are connected. In this case, the switches 11, 12 and 7', 8 are selected to establish the connection between the elements B, C' and C', D by the lines $\gamma$ and $\alpha'$ respectively. If these lines are already in use, the elements of the same kind as the element C are successively selected until the desired connection is established. The desired connection for the element B can be simultaneously attained.

The first to third methods above described are effective in the case in which the number of elements is relatively small as shown in FIG. 8 compared with the number of analog elements actually installed in a computer system. Further, these methods are effective in solving the problem arising in the initial stage of connection. However, in an analog and a hybrid computer, the majority or all of the principal elements such as integrators, adders and multipliers are simultaneously placed in operation except the potentiometers which are provided in a relatively large number compared with the other elements, and the situation of impossibility of connection described hereinbefore occurs mostly in the final stage of connection. Thus, the elements are not interchangeable in most cases. However, due to the fact that the potentiometers are commonly provided in the number giving a sufficient margin, extra potentiometers may be interposed between the elements C and D. It is apparent in FIG. 2 that the selection of the potentiometer P cannot attain the connection between the element D and the input terminals $c$ and $d$ of the element C. Thus, the potentiometer P' is selected and the switches 13, 14, 15 and 16 are selected to complete the connection. In this case, the potentiometer P' is set at +1 so that the interposition of the potentiometer P' between the elements C and D may not adversely affect the operation of the circuit. In this manner, the route connecting the elements C, P' and D is completed by the lines $\gamma$ and $\delta$. Electronic coefficient multipliers (digital potentiometers) include the type in which the polarity is inverted and the type in which no polarity inversion occurs. Two of them must be connected in series when they are of the type in which the polarity is inverted. In such a case, four extra lines are required and the connecting ability of the matrix is reduced correspondingly, which is undesirable. To deal with this case, an external terminal ⑥ to be exclusively used for changing the lines may be provided as shown in FIG. 2 so that, in the event of occurrence of the situation of impossibility of connection, the user or operator can short-circuit the input side $T_I$ of the external terminal ⑥ to the output side $T_O$ as shown by the dotted line. In this case, the switches 13, 14', 15' and 16 are selected and the element C is connected with the element D by the lines $\gamma$ and $\delta$. If anyone of the lines $\gamma$ and $\delta$ is already in use, the terminal $T_I'$ (not shown) corresponding to the terminal $T_I$ or the terminal $T_O'$ (not shown) corresponding to the terminal $T_O$ may be selected. If the desired connection is still impossible even by the above procedure, both of the terminals $T_I'$ and $T_O'$ may be selected in lieu of the terminals $T_I$ and $T_O$. The software may be suitably designed so as to inform the user of which terminal should be short-circuited. After the above procedure for changing the lines, the switches 17 and 18 may be selected for establishing the connection between the elements D and A, thereby completing all the connection on the operating circuit.

Figure 9:
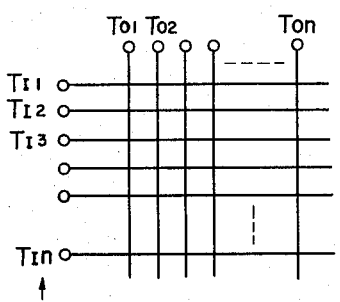
FIG. 9 shows means for automatically short-circuiting a terminal in FIG. 2 for changing the connection.

Automatic short-circuiting may be applied to the line-changing terminal in lieu of the manual short-circuiting. This can be attained by a switch matrix as shown in FIG. 9. While the present invention has been described with reference to a two-stage switch matrix, the present invention is applicable also to a multi-stage switch matrix such as a three-stage switch matrix.

Finally, the process of connection will be described again with reference to the circuit shown in FIG. 8. The information concerning the circuit shown in FIG. 8 is prepared in the form of lists as shown in FIG. 3. In this case, the lists corresponding to the elements A, B, C and D are prepared. The logical name in the list corresponding to the element A which is the starting point of connection is identified so as to ascertain the fact that the element A is an integrator. Then, by reference to the table shown in FIG. 4, an actual integrator is detected therefrom and a sound integrator belonging to the module M1 is determined after identifying whether or not this integrator belongs to the module M1 and whether or not this integrator is sound or free from any fault. Then, from the logical name in the list corresponding to the element B which is to be connected to the input of the integrator, the element B is identified as a potentiometer, and by reference to the table shown in FIG. 4, a potentiometer belonging to the module M1 is identified and selected. The coordinates of the input terminal of the element A or integrator, the block number of the stage b to which this input terminal is connected, the coordinates of the output terminal of the element B or potentiometer, and the block number of the stage a to which this output terminal is connected, are readily identified by reference to the table shown in FIG. 4. Then, the switches and line to be used are sought by simple arithmetic operation. This information is the final information used for turning on the switches and is stored in the core memory in the form of a table. Subsequently, the switches and line for establishing the connection between the elements B and C are similarly determined. In this case, the switch table above described is referred to so as to inspect whether or not the same switches are selected. When the same switches and line are selected, the line is changed according to the procedure above described.

It will be understood from the foregoing description that the present invention is advantageous in that it enables to allocate actual elements to an operating circuit at a high speed and reduces the number of switches in a switch matrix by virtue of the effective utilization of the switch matrix. The present invention is further advantageous in that, even if an undesirable situation of impossibility of connection should occur, such a situation is very quickly eliminated and the connection can be continued without recommencing the connection from the starting point, thereby reducing the period of time required for changing the connection and remarkably increasing the ability of connection. This fact has been ascertained on an actual hybrid computer of the automatic connection type.

We claim:

1. A hybrid computing system of the automatic connection type comprising a plurality of analog operating elements, and a multi-stage switch matrix for carrying out the automatic connection between said analog operating elements, said analog operating elements being divided into a plurality of groups each called a module so that suitable ones of said elements can be selected from said modules for constituting a desired operating circuit, wherein said modules are respectively numbered and said elements are successively selected in one direction starting from the module having the smallest or largest number.

2. A hybrid computing system of the automatic connection type as claimed in claim 1, wherein the order of priority is such that the element having a largest number of input terminals or fan-outs is given a highest priority and said elements are successively allocated in the order of those having a higher priority.

3. A hybrid computing system of the automatic connection type as claimed in claim 1, wherein the order of priority is such that the element having a largest number of input terminals or fan-outs is given a highest priority so that said elements can be successively allocated in the order of those having a higher priority, and when the connection cannot be attained due to unsuitable allocation of said elements for the operation demand, the input terminal of one of said elements is interchanged with another input terminal, or one of said elements is interchanged with another element of the same kind, or a further element is interposed between the elements to be connected with each other.

4. A hybrid computing system of the automatic connection type as claimed in claim 1, wherein a connection changing terminal is interposed between the elements to be connected with each other so that the connection can be continued through said terminal.

* * * * *